(12) United States Patent
Bierbaum et al.

(10) Patent No.: US 7,967,196 B1
(45) Date of Patent: Jun. 28, 2011

(54) ELECTRONIC WALLET READY TO PAY TIMER

(75) Inventors: Christopher J. Bierbaum, Overland Park, KS (US); Allison A. DiMartino, Overland Park, KS (US); Robert H. Miller, Leawood, KS (US); Elizabeth Roche, Prairie Village, KS (US); Jason Whitney, Lee's Summit, MO (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 367 days.

(21) Appl. No.: 12/058,529

(22) Filed: Mar. 28, 2008

(51) Int. Cl.
*G06K 5/00* (2006.01)
(52) U.S. Cl. ......... 235/380; 235/375; 235/379; 235/492
(58) Field of Classification Search .................. 235/375, 235/379, 380, 492
See application file for complete search history.

(56) References Cited

U.S. PATENT DOCUMENTS

| | | | | |
|---|---|---|---|---|
| 5,590,038 | A | * | 12/1996 | Pitroda ........................... 705/41 |
| 6,076,075 | A | * | 6/2000 | Teicher ........................... 705/41 |
| 7,707,113 | B1 | | 4/2010 | DiMartino et al. |
| 2002/0025797 | A1 | * | 2/2002 | Joao et al. ...................... 455/406 |
| 2004/0072589 | A1 | * | 4/2004 | Hamamura et al. ........ 455/550.1 |
| 2004/0103063 | A1 | * | 5/2004 | Takayama et al. ............... 705/41 |
| 2005/0177370 | A1 | * | 8/2005 | Hwang et al. ................. 704/270 |
| 2006/0189345 | A1 | * | 8/2006 | Suzuki et al. ............... 455/550.1 |

OTHER PUBLICATIONS

DiMartino, Allison, "Method for Launching an Electronic Wallet," filed Dec. 3, 2007, U.S. Appl. No. 11/949,759.
DiMartino, Allison, "Method and System for Blocking Confidential Information at a Point-of-Sale Reader from Eavesdropping," filed Sep. 27, 2007, U.S. Appl. No. 11/863,229.

* cited by examiner

*Primary Examiner* — Daniel A Hess
*Assistant Examiner* — Ali Sharifzada

(57) ABSTRACT

A mobile device having a time controlled electronic wallet is disclosed. The mobile device comprises a processor and an electronic wallet application that executes on the processor. The electronic wallet application enters a ready-to-pay mode, initiates a ready-to-pay timer when entering the ready-to-pay mode, transmits the confidential information when in the ready-to-pay mode based on receiving contactless communication, and leaves the ready-to-pay mode when the ready-to-pay timer expires.

13 Claims, 6 Drawing Sheets

FIG. 5
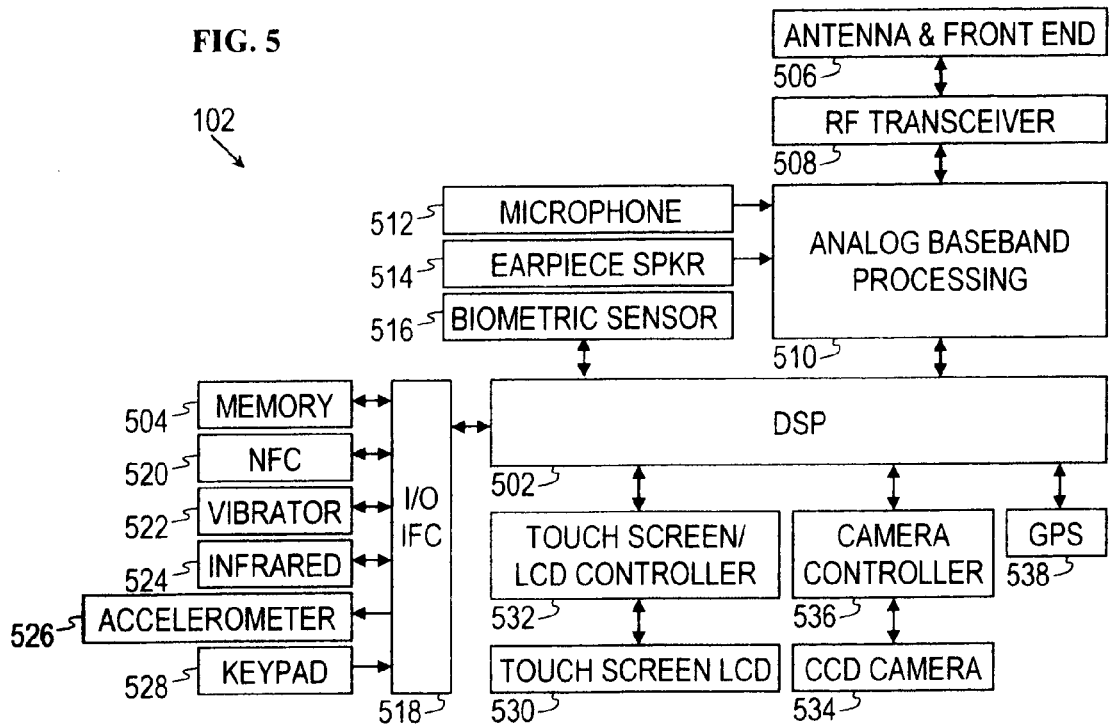
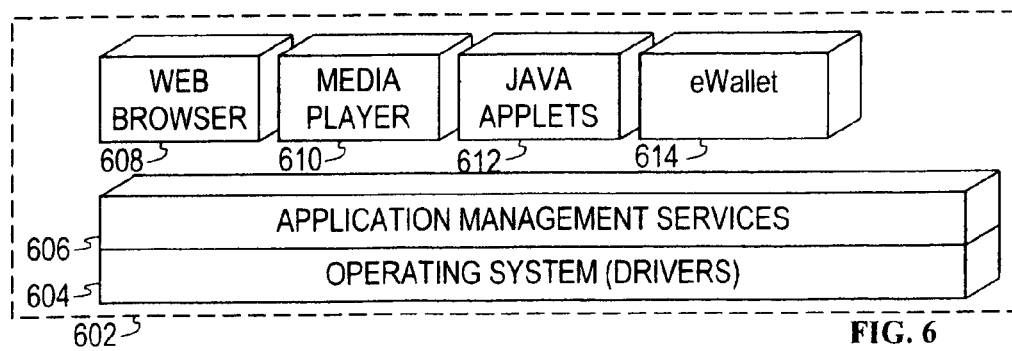
FIG. 6

ELECTRONIC WALLET READY TO PAY TIMER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A variety of alternatives to using cash may be used for paying for goods and services. Credit cards, debit cards, and smart cards may be used to pay for grocery purchases, retail purchases, gasoline purchases, restaurant purchases, etc. Transit cards may be used to purchase a ride on a mass transportation vehicle such as a bus or a subway train. Toll payment devices, sometimes referred to as toll tags, may be used to pay tolls without stopping or slowing down at a toll booth, and/or pay for parking fees at airports. The ease with which these payment cards may be stolen and used for purchases of goods and services by someone other than the card holder or authorized proxies of the card holder, which may also be referred to as identity theft, makes payment card security an important subject.

A portable electronic device may include an electronic wallet application, also referred to as an eWallet, that provides a variety of financial and payment capabilities. The electronic wallet application supports paying for products or services with the portable electronic device in much the same way as presenting a credit card, a debit card, a smart card, a transit card, or a toll tag for payment. The portable electronic device may communicate with a point-of-sale (POS) terminal using contactless communication means, for example near field communication (NFC) technology, to provide the appropriate financial information to complete a payment transaction.

SUMMARY

A mobile device having a time controlled electronic wallet is provided. The mobile device comprises a processor and an electronic wallet application that executes on the processor. The electronic wallet application enters a ready-to-pay mode, initiates a ready-to-pay timer when entering the ready-to-pay mode, transmits the confidential information when in the ready-to-pay mode based on receiving contactless communication, and leaves the ready-to-pay mode when the ready-to-pay timer expires.

A method of completing a payment from an electronic wallet is provided. The method comprises the electronic wallet entering a ready-to-pay electronic wallet mode of operation and starting a ready-to-pay timer, based on entering the ready-to-pay electronic wallet mode of operation. The method also comprises the electronic wallet leaving the ready-to-pay electronic wallet mode of operation when the ready-to-pay timer expires. The method also comprises the electronic wallet receiving payment transaction messages and transmitting payment information in response to receiving the payment transaction messages, if the electronic wallet is in the ready-to-pay electronic wallet mode of operation.

A method of reducing identity theft is provided. The method comprises opening an electronic wallet and transmitting payment information from the electronic wallet to complete an authorized purchase transaction. The method also comprises accumulating time based on opening the electronic wallet and closing the electronic wallet after the accumulating time exceeds a first limit.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is an illustration of a block diagram of a portable electronic device according to an embodiment of the disclosure.

FIG. 6 is an illustration of a block diagram of a software architecture of a portable electronic device according to an embodiment of the disclosure.

DETAILED DESCRIPTION

Figure 1:
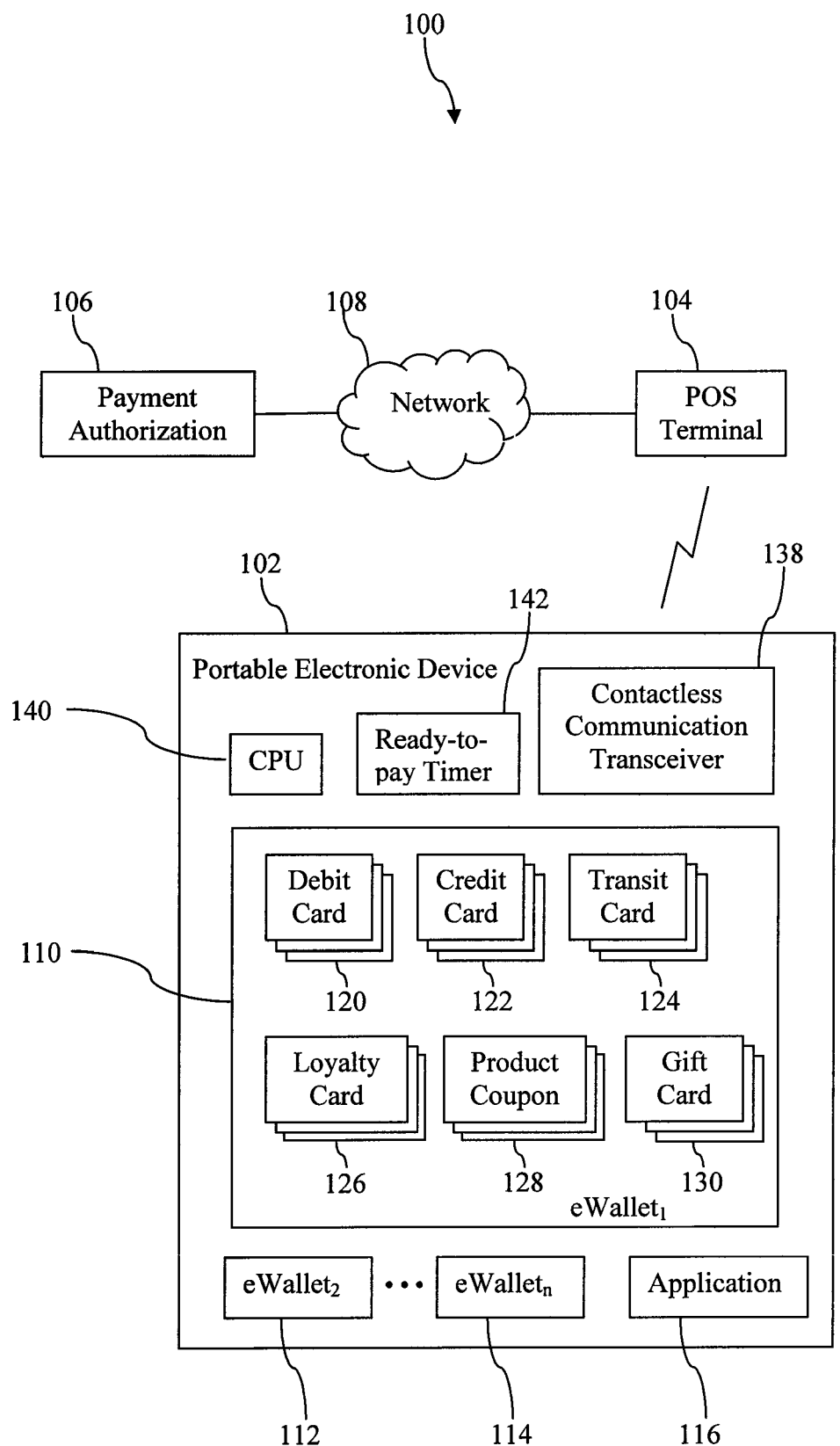
FIG. 1 is an illustration of an electronic payment system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, various timer-based features for controlling the access to confidential information stored in an electronic wallet are disclosed. When a user of an electronic wallet approaches a point-of-sale terminal, the user may prepare the electronic wallet to make it ready for releasing payment information, so as to reduce their waiting time and the waiting time of others in line behind the user. In addition to payment information such as credit card account numbers, personal identification numbers, transit card numbers, and others, the electronic wallet may store other sensitive information such as vehicle electronic access codes, building electronic access codes, and other electronic information. All of this sensitive information may be referred to generally as confidential information. When the electronic wallet is ready for releasing the payment information, the confidential information contained by the electronic wallet may be more vulnerable to identity theft. In an embodiment, a ready-to-pay timer is initialized when the electronic wallet is made ready for releasing the confidential information, for example when the electronic wallet is launched and opened for payment. The ready-to-pay timer tracks the passage of time, and after a short passage of time, if the electronic wallet has not yet been closed, the ready-to-pay timer causes the electronic wallet to close. This functionality may reduce the vulnerability of the electronic wallet to identity theft of the confidential information when the user forgets to close the electronic wallet after completing a payment transaction. Robust security features such as the time-out function may promote the more rapid adoption of the electronic wallet paradigm by the general public. In some embodiments the ready-to-pay timer is only responsible for tracking the passage of time and some other application or component is responsible for causing the electronic wallet to close, for example in response to a time-out message from the ready-to-pay timer.

Several extensions of the basic electronic wallet time-out function are contemplated by the present disclosure. The time remaining until expiration of the ready-to-pay timer and the closing of the electronic wallet may be displayed on the portable electronic device containing the electronic wallet. A first soft key of the device containing the electronic wallet may be activated to reset the ready-to-pay timer, for example extending the time-out interval by an additional increment of time. This also may be referred to in some contexts as extending the ready-to-pay timer for a pre-determined time duration. In another embodiment, the ready-to-pay time may be extended for the pre-determined time duration by activating another input mechanism, for example by activating a physical key or button, or some other input mechanism provided by the mobile device. The device may alert the user to the approaching expiration of the ready-to-pay timer, for example with audible alerts, vibration alerts, and/or visible alerts. In some contexts, these alerts may be referred to as cues, for example, an audible cue, a vibration cue, and a visible cue. The frequency or duty cycle of alerts may change progressively as the expiration of the ready-to-pay timer gets closer and closer. As is known to one skilled in the art, a soft key may be a button or key located proximate a display that selects or triggers a function dependent on the text or other indication shown in the display at the time the soft key is activated. In some contexts herein, the concept of the soft key may be extended to also include a key having a programmable function, for example a key that may or may not be located proximate to the display and that has a function programmed by an application of a device. In some contexts herein, the function of soft keys may differ based on an operational mode of an application. All of these related concepts are contemplated herein when using the term soft key.

A second soft key of the device containing the electronic wallet may allow the user to circumvent the ready-to-pay timer and close the electronic wallet on activation of the second soft key. Similarly, the device may circumvent the ready-to-pay timer and close the electronic wallet in response to receiving a payment complete message from a point-of-sale terminal. In an embodiment, a second timer may be activated when the electronic wallet is closed, for example automatically on completion of a payment or manually by selecting the second soft key. While the second timer has not expired, the user may re-launch and/or reopen the electronic wallet by activating a third soft key or other simple activation procedure. Re-launching and/or reopening the electronic wallet in this way may be referred to in some contexts, as reawakening the electronic wallet and the second timer, in some contexts, may be referred to as the reawaken timer. This feature may support the convenience of quickly reopening the electronic wallet for payment at a checkout line when the consumer has forgotten to check or scan a retail item, for example a case of soft drinks overlooked in the bottom rack of a shopping cart. This feature may promote rapid reopening of the electronic wallet, for example, by scaling back customary authentication procedures by skipping one or more steps and/or by relying upon temporarily stored data from recent operations, for example data provided by a user of the electronic wallet and/or the point-of-sale terminal.

The ready-to-pay timer and the reawaken timer may be user configurable. Alternatively these timers may adopt to the time of day, the contents of a shopping cart, the retail location, and other contextual cues. In an embodiment, the default ready-to-pay timer may expire after about two minutes, but in other embodiments other expiration durations may be employed.

Turning now to FIG. 1, an electronic payment system 100 for completing payment transactions according to an embodiment of this disclosure is discussed. The system 100 comprises a portable electronic device 102, a point-of-sale (POS) terminal 104, a payment authorization center 106, and a network 108. In some contexts, the portable electronic device 102 may be referred to as a mobile device. A payment for a product or service may be made electronically by the portable electronic device 102 through contactless communication with the POS terminal 104, for example by communicating payment information such as a credit card number or a transit card account number. In an embodiment, the portable electronic device 102 may comprise a contactless communication transceiver 138 that the portable electronic device 102 uses to communicate with the POS terminal 104 and/or with other external devices. The information communicated from the portable electronic device 102 to the POS terminal 104 may include a personal identification number (PIN) and/or other authentication information or tokens. The information communicated to the POS terminal 104 may also include coupon information and/or customer loyalty information. For purposes of the present disclosure, contactless communication is intended to include a wide variety of communication means including near field communication (NEC) technology, infrared, ultra-sonic, optical, radio frequency, wireless, Bluetooth, Wi-Fi, and other communication links that do not involve direct physical contact. In an embodiment, the POS terminal 104 completes the payment transaction by handshaking with the payment authorization center 106, communicating with the payment authorization center 106 through the network 108. In another embodiment, the POS terminal 104 completes the payment transaction without communicating with the payment authorization center 106, for example when the payment information for a debit card is provided by the portable electronic device 102. The completion of a payment transaction by an authorized user of the portable electronic device 102, for example in a process similar to that described above, may be referred to as an authorized payment transaction.

The POS terminal 104 may be embodied as a general purpose computer system, to be discussed in greater detail hereinafter. The POS terminal 104 communicates via contactless communication with the portable electronic device 102. The POS terminal 104 may be connected to databases or networked to servers (not shown) which provide product and service pricing information, including any discounting associated with a loyalty card and/or product coupons. In an embodiment, the POS terminal 104 may include a device for scanning a product, for example a bar code reader or radio frequency identification (RFID) reader, to identify a product and to add the associated cost to an accumulating purchase total.

The payment authorization center 106 may authenticate and authorize charges to a credit card such as VISA card, AMERICANEXPRESS card, MASTERCARD card, DISCOVER card, gasoline company card, or other credit card. The authorization handshake may require transmission of account identification, for example an account number or a credit card number. Additionally, the authorization handshake may require further authentication information such as a personal identification number (PIN), a driver's license number, a security code associated with the credit card, or other authentication information. If the payment authorization center 106 approves the transaction, the payment authorization center 106 charges the appropriate account in the amount of the transaction and sends payment approval. The payment authorization center 106 may be implemented as a general purpose computer system.

The network 108 may be any of a public switched telephone network (PSTN), a public data network (PDN), or a combination thereof.

The portable electronic device 102 may be any of a variety of devices including but not limited to a mobile phone, a personal digital assistant (PDA), a laptop computer, a tablet computer, or other portable electronic device. In an embodiment, the portable electronic device 102 may have a screen size reduced to a maximum of about four inches by about six inches (a maximum of about ten centimeters by about fifteen centimeters). In some contexts herein, this may be referred to as a portable electronic device having a reduced screen size. An exemplary embodiment of a handset suitable to implementing several embodiments of this disclosure, for example a mobile phone and a PDA, is discussed in detail hereinafter.

The portable electronic device 102 includes one or more applications 116 that provide services and functionality to a user, such as a mobile phone subscriber or a PDA user. These applications 116 may include, but are not limited to, a mobile telephone service, an electronic wallet, an email service, an address book, a contacts list, a spreadsheet, a scheduler, a virtual private network (VPN) portal, a web browser, and other applications. In an embodiment, these applications 116 may be launched or activated or started by a number of methods. When an application 116 is inactive or not yet launched, accessing the functionality of the application 116 may involve first loading at least portions of the application 116 into a memory area that is more accessible or more rapidly accessible to a processor 140 of the portable electronic device 102. In an embodiment, this process of loading at least portions of the application 116 into the memory area accessible to the processor 140 is what is referred to in the expression launching or activating the application 116.

An electronic wallet application, also referred to as an eWallet, provides a variety of financial and payment capabilities. The electronic wallet application supports paying for products or services with the portable electronic device 102 in much the same way as presenting a credit card, a debit card, a transit card, a gift card, and/or a coupon for payment. Additionally, the electronic wallet application may promote paying from a payment account.

In an embodiment the portable electronic device 102 includes a plurality of electronic wallets, for example a first electronic wallet 110, a second electronic wallet 112, and a third electronic wallet 114. Each of the several electronic wallets 110, 112, and 114 may be associated with different members of a family, for example a father, a mother, and a child. Alternatively, each of the several electronic wallets 110, 112, and 114 may be associated with different employees of a business firm. Alternatively, each of the electronic wallets 110, 112, 114 may be associated with different roles of an individual, for example a personal wallet, a business wallet, and a social organization wallet. The individual may use the personal wallet for buying a birthday gift for a spouse, use the business wallet to pay for business related expenses, and use the social organization wallet to pay for food for a group campout. In an embodiment, the electronic wallet launching input sequence may select one of the electronic wallets 110, 112, 114. In another embodiment, the electronic wallet launching sequence may trigger the display to show a selector, for example a dialog box or window, to select one of the electronic wallets 110, 112, 114.

In an embodiment, the first electronic wallet 110 includes one or more debit cards 120, credit cards 122, transit cards 124, loyalty cards 126, product coupons 128, and gift cards 130. A loyalty card 126 may be used by a retail store, for example a grocery store, to link or associate a purchase session with a customer, perhaps for the purposes of conducting marketing research, customer purchasing behavior research, etc. A gift card 130 may be a debit card issued by a specific store or business, for example a book store gift card or a restaurant gift card. In an embodiment, when the first electronic wallet 110 is launched all of the payment information contained by the electronic wallet, including the debit cards 120, the credit cards 122, the transit cards 124, the loyalty cards 126, the product coupons 128, and the gift cards 130 become immediately accessible. In another embodiment, at least some of the payment information is protected, for example requiring the designation of a PIN to make one of the credit cards 122 accessible. In an embodiment, accessibility of the debit cards 120, the credit cards 122, the transit cards 124, the loyalty cards 126, the product coupons 128, and the gift cards 130 is configurable on the device 102 by a user.

In an embodiment, the portable electronic device 102 has a ready-to-pay timer 142. The ready-to-pay timer 142 may be one of several hardware timers built into the portable electronic device 102 that may be used for various purposes by applications that execute on the portable electronic device 102. Alternatively, the ready-to-pay timer 142 may be a software component, for example a software component of the first electronic wallet 110, that may be implemented by storing an initial time referenced to a clock time or system time known to the portable electronic device 102 and determining a run time of the timer by comparing the system time to the stored initial time. One skilled in the art, in combination with the present disclosure, may readily implement the ready-to-pay timer 142 in a variety of well known ways.

For additional details about systems and methods of launching electronic wallets, providing an interface based on different levels of electronic wallet security, and protecting the disclosure of confidential information by an electronic wallet see pending U.S. patent application Ser. No. 11/949,759 filed Dec. 3, 2007, titled "Method for Launching an Electronic Wallet" by DiMartino et al; U.S. patent application Ser. No. 11/863,632 filed Sep. 28, 2007, titled "Method and System for Setting Levels of Electronic Wallet Security" by DiMartino et al; and U.S. patent application Ser. No. 11/863,229 filed Sep. 27, 2007, titled "Method and System for Blocking Confidential Information at a Point-of-Sale Reader From Eavesdropping" by DiMartino et al, all of which are incorporated by reference herein for all purposes.

The ready-to-pay timer 142 may be used to implement a security feature to help protect the confidential information contained in the electronic wallets 110, 112, and 114 and/or the applications 116 from identity theft. For example, when the first wallet 110 has been opened and a payment card has been selected for payment, the ready-to-pay timer 142 can be used by the first electronic wallet 110 to automatically close after the ready-to-pay timer 142 marks the passage of a limited period of time. Another way of saying this is the first electronic wallet 110 may be configured or programmed to close after the ready-to-pay timer 142 exceeds a time threshold, a time limit, or simply a limit. For example, the first electronic wallet 110 may close automatically after about 1 minute of elapsed time, after 2 minutes of elapsed time, after about 4 minutes of elapsed time, or after some other period of time. This may be referred to as an open wallet time-out or a time-out feature. In an embodiment, all of the electronic wallets 110, 112, and 114 may be protected with the time-out function; in another embodiment, selected ones of the electronic wallets 110, 112, and 114 may be protected with the time-out functions while the other electronic wallets are not protected with the time-out function.

In an embodiment, the portable electronic device 102 may promote a user configuring the open wallet time-out time interval, time threshold, or time limit. In an embodiment, the open wallet time-out time interval may be adaptable based on a context of wallet use. For example, the open wallet time-out time interval may adopt based on a time of day and a day of the week. For example, the open wallet time-out time interval may be less during mid-day on a Wednesday, based on the expectation that shopper flow through at the point-of-sale terminal 104 is normally smooth and consistent at mid-day. Alternatively, the open wallet time-out time interval may be longer at 3 PM on a Saturday based on the expectation that shopper flow through at the point-of-sale terminal 104 may be less smooth and consistent at that time, as shopper volumes increase and check-out anomalies increase. The open wallet time-out time interval may be adaptable based on identity of the retail location in which the point-of-sale terminal 104 is located. The open wallet time-out time interval may be adaptable based on a volume or number of products in a shopping cart associated with the portable electronic device 102. Still other context cues may be used to adopt the open wallet time-out interval of the portable electronic device 102.

In an embodiment, an indication of the passage of time of the ready-to-pay timer 142 is displayed on a display of the portable electronic device 102. For example, the remaining seconds to open wallet time-out may be displayed. Alternatively, the accumulated time since the electronic wallet 110 was opened may be displayed. Displaying accumulated time may have the disadvantage that the user must be aware of the time-out interval and mentally calculate remaining time to time-out. At the same time, displaying accumulated time may have the advantage of preventing an identity thief from anticipating when the first electronic wallet 110 may close based only on observing the display of accumulated time.

In an embodiment, an alert of the approach of the expiration of the open wallet time-out time interval may be provided by the portable electronic device 102. For example, when 15 seconds remain before the expiration of the open wallet time-out interval, the portable electronic device 102 may begin sounding an audible alert every 2 seconds. Alternatively, when 15 seconds remain before the expiration of the open wallet time-out interval, the portable electronic device 102 may sound a first audible alert for 5 seconds, a second audible alert for 5 seconds, and a third audible alert tone for the final 5 seconds, each different audible alert associated with a higher concern level. In an embodiment, the audible alert may pulse on and off at a low frequency initially and increase the rate of on and off pulsing as the expiration of the open wallet time-out interval approaches more closely. In an embodiment, the portable electronic device 102 may alert the user of the approaching expiration of the open wallet time-out interval by vibrating. As above, the device may alternate between vibrating and not vibrating at different cycle rates as the expiration of the open wallet time-out interval approaches more closely. Other alert mechanisms may be employed, including a visual alert and others. In some contexts, the audible alert, the vibration alert, the visual alert, and other alerts also may be referred to as cues, for example an audible cue, a vibration cue, and a visible cue, A variety of alert time periods are contemplated by this disclosure. In an embodiment, the time thresholds of the alert function is configurable by the user.

In an embodiment, a soft key or a dedicated function key of the device 102 may promote the user extending the open wallet time-out interval or resetting the initial time of the ready-to-pay timer 142. A soft key may be a key whose function can change based on an operation mode of the portable electronic device 102. The current function of a soft key may be indicated on the key itself or in a portion of a display of the portable electronic device 102 proximate the soft key. As an example, the user may see that check-out of the customer ahead of them in the check-out line is taking longer than anticipated and that the open wallet time-out time interval is approaching time-out or expiration. In this case, the user may wish to avoid the hassle of reopening the first electronic wallet 110 and selecting a payment card by resetting the initial time of the ready-to-pay timer 142 to, for example, have an additional two minutes of time to keep the electronic wallet 110 open. In an embodiment, the soft key or dedicated function key may add a constant increment of time or duration of time, for example about 15 seconds, and the user may repeatedly activate the soft key or dedicated function key to extend the open wallet time-out period an integral number of increments. In some contexts this may be referred to as extending the ready-to-pay timer by a pre-determined time duration. For example, activating the soft key four times may extend the open wallet time-out period by about 1 minute. In another embodiment, different pre-determined time durations may be employed, for example a thirty second pre-determined time duration, a forty-five second pre-determined time duration, a sixty second pre-determined time duration, or some other pre-determined time duration. In another embodiment, the ready-to-pay time may be extended for the pre-determined time duration by activating another input mechanism, for example by activating a physical key or button, or some other input mechanism provided by the mobile device.

In an embodiment, upon completion of the payment transaction between the portable electronic device 102 and the point-of-sale terminal 104, the electronic wallet 110 closes automatically and the ready-to-pay timer 142 is cleared or released. In another embodiment, the ready-to-pay timer 142 is not changed, the electronic wallet 110 simply closes. In an embodiment, a soft key or a dedicated function key may be configured to permit the user to close the electronic wallet 110 immediately, in a manner similar to the closing of the electronic wallet 110 triggered by the completion of the payment transaction as described above.

In an embodiment, a reawaken wallet time-out time interval may be supported by the portable electronic device 102 and/or the electronic wallets 110, 112, 114. In this case, after the first electronic wallet 110 closes upon completion of the payment transaction as described above, a reawaken wallet time-out interval begins counting down. If the reawaken wallet time-out interval has not expired, the user may easily and conveniently reawaken the first electronic wallet 110 and select the previously selected payment card with a single key activation, for example by activating a soft key or a dedicated function key. In some contexts, the user action that reawakens the first electronic wallet 110 may be referred to as an electronic wallet fast open input. This feature may be a convenience if the user completes payment at the point-of-sale terminal 104, the electronic wallet 110 closes, and then the user discovers an additional item they intended to purchase that did not get checked before, for example a box of soft drinks stored in the lower rack of a shopping cart at a grocery store. This feature would allow the user to reawaken the electronic wallet 110 and select the previous payment card with one key activation. Alternatively, this feature may promote rapid and/or simplified reopening of the electronic wallet, albeit based on activating a plurality of keys, for example, by scaling back customary authentication procedures by skipping one or more steps and/or by relying upon temporarily stored data from recent operations, for example data provided by a user of the electronic wallet and/or the point-of-sale terminal. This feature would only function during the reawaken wallet time-out interval. After the expiration of the reawaken wallet time-out interval the user would have to employ the standard methods for launching and opening the electronic wallet 110 and selecting the payment card to complete a payment transaction.

Figure 2:
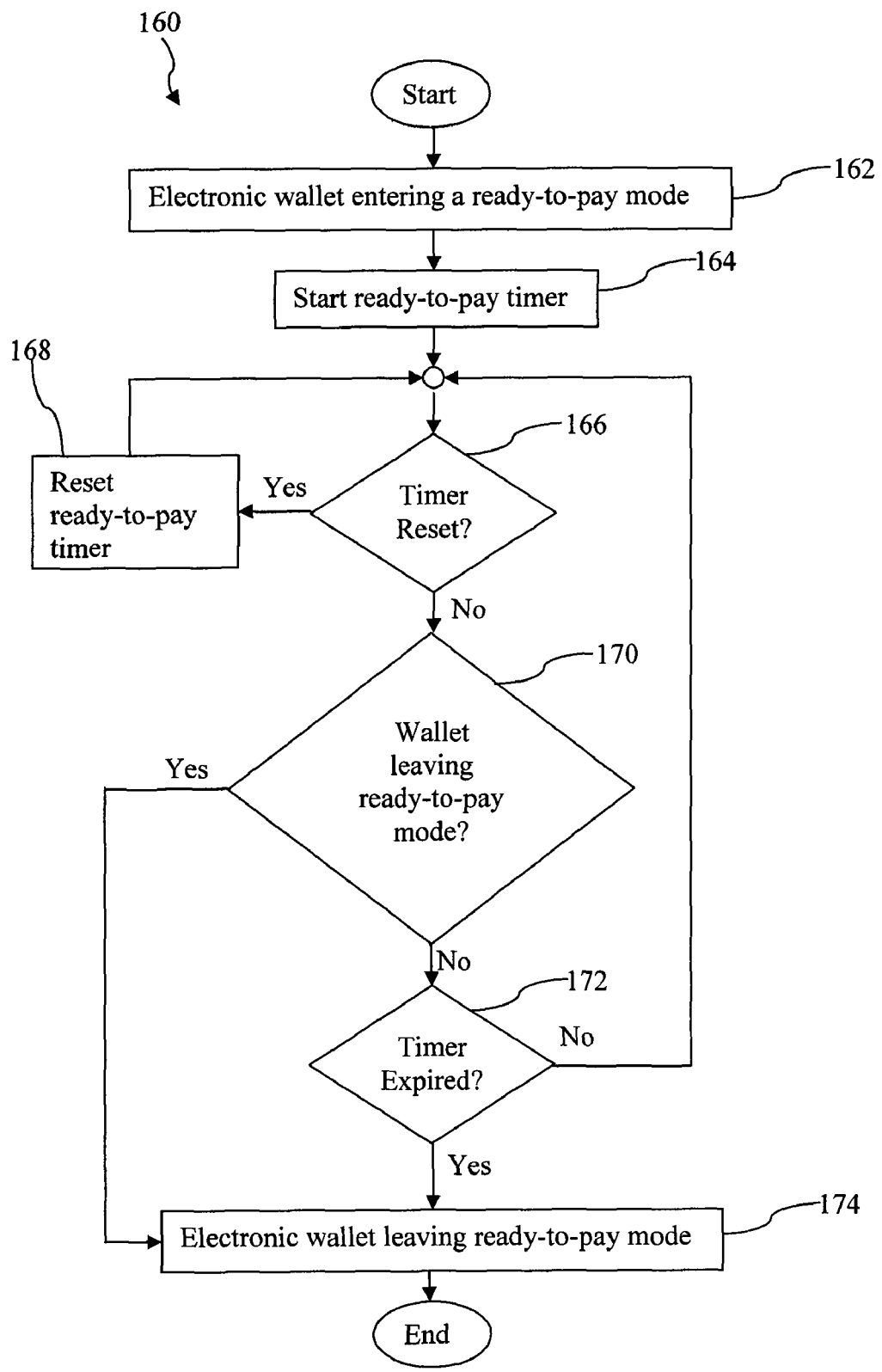
FIG. 2 is a flow chart of a method for using an electronic wallet ready-to-pay timer according to an embodiment of the disclosure.

Turning now to FIG. 2, a method 160 for completing a payment from an electronic wallet is described. At block 162, the electronic wallet enters a ready-to-pay mode. For example, the first electronic wallet 110 enters a ready-to-pay mode. In an embodiment, a user may place the first electronic wallet 110 in the ready-to-pay mode by first launching the wallet by any of a variety of means and by selecting a payment card to be active. In some circumstances, the user may enter a personal identification number (PIN) and/or other authentication information or authentication tokens. In some circumstances, the user may select coupons for redemption during the payment transaction.

At block 164, a ready-to-pay timer is started. For example, the ready-to-pay timer 142 may be started. Timers may be implemented in a variety of ways. Timers may count up or timers may count down. A timer may be implemented by storing an initial time and calculating an elapsed time. A timer may be implemented with a dedicated hardware timer that may be set and which may generate an interrupt when the timer expires. All of these timer implementations and others are contemplated by this disclosure. In an embodiment, the ready-to-pay timer 142 is started in response to the electronic wallet entering the ready-to-pay mode.

At block 166, if the timer is reset, for example by a user activating a soft key or a dedicated function key associated with resetting the ready-to-pay timer 142, the method 160 proceeds to block 168. At block 168, the ready-to-pay timer 142 is reset. For example, the ready-to-pay timer 142 may be restarted. Resetting the ready-to-pay timer 142 may have the effect of extending the time that the first electronic wallet 110 remains open before closing automatically in response to expiration of the time-out interval. If the ready-to-pay timer 142 is not reset, the method 160 proceeds to block 170.

At block 170, if the first electronic wallet 110 is commanded to leave the ready-to-pay mode, for example by the user activating a soft key of a dedicated function key that commands the first electronic wallet 110 to leave the ready-to-pay mode or an authorized payment transaction with the POS terminal 104 has been completed, the method 160 proceeds to block 174 where the first electronic wallet 110 leaves the ready-to-pay mode. When the first electronic wallet 110 leaves the ready-to-pay mode, the confidential information is unavailable for reading. This may be accomplished by closing or deactivating the first electronic wallet 110. If the first electronic wallet 110 is not commanded to leave the ready-to-pay mode, the method proceeds to block 172.

At block 172, if the ready-to-pay timer 142 has not expired, the method 160 returns to block 166. While the ready-to-pay timer 142 does not expire, the method 160 may continue to loop through blocks 166, 170, and 172 repeatedly. In an embodiment, the method 160 may include a delay or blocking step, not shown, to avoid the processor 140 consuming all or much of its processing power in busy waiting. In an embodiment, the method 160 may go to sleep or otherwise surrender the attention of the processor 140 for lengths of time, for example for about 10 milliseconds, for about 100 milliseconds, for about 1 second, or for some other time interval. At block 172, if the ready-to-pay timer 142 has expired, the method proceeds to block 174 where the first electronic wallet 110 leaves the ready-to-pay mode, as described above. In some contexts, the ready-to-pay timer 142 expiring may be referred to as exceeding a limit.

In an embodiment, the method 160 may not take action based on a timer reset command, and hence blocks 166 and 168 may be inoperative or not programmed. In an embodiment, the method 160 may not take action based on completion of a payment transaction or based on a user input commanding the electronic wallet to leave the ready-to-pay mode, and hence block 170 may be inoperative or not programmed.

Figure 3:
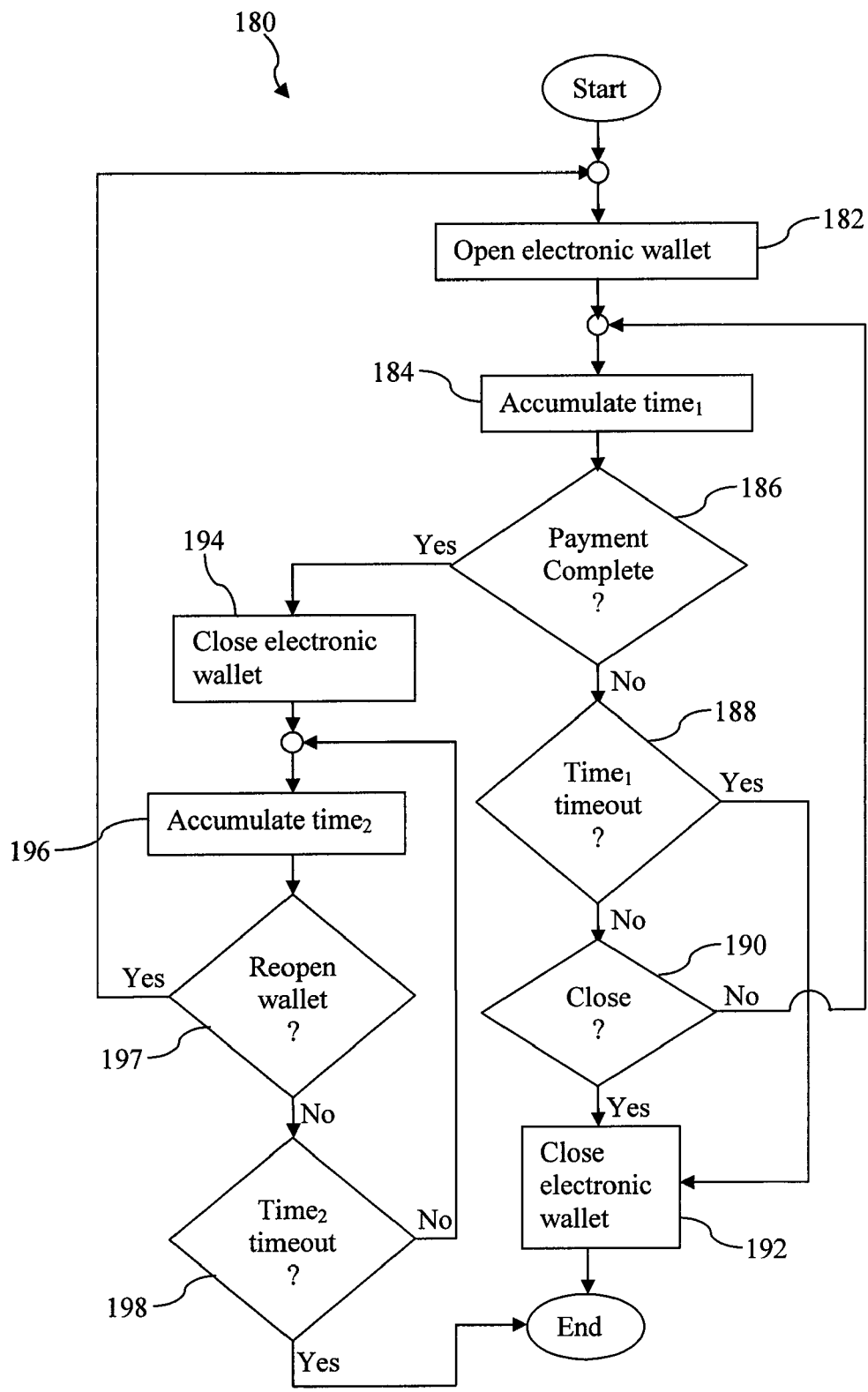
FIG. 3 is a flow chart of another method for using an electronic wallet ready-to-pay timer according to an embodiment of the disclosure.

Turning now to FIG. 3, a method 180 of reducing identity theft is described. At block 182, an electronic wallet is opened. For example, the first electronic wallet 110 is opened. At block 184, time is accumulated in a first timer, for example in the ready-to-pay timer 142. As discussed above, a timer may be implemented in a variety of manners. The first timer is initialized or started in response to the first electronic wallet 110 being opened. At block 186, if an authorized payment transaction has not been completed, for example, if a payment transaction of the first electronic wallet 110 with the POS terminal 104 has not been completed, the method 180 proceeds to block 188.

At block 188, if the first timer has expired, the method 180 proceeds to block 190 where the first electronic wallet 110 is closed. In some contexts, the first timer expiring may be referred to as the first timer exceeding a limit or a first limit. If the first timer has not expired, the method 180 proceeds to block 190. If the first electronic wallet 110 is commanded to close, for example by activation of a soft key or a dedicated function key, the method 180 proceeds to block 192 where the first electronic wallet 110 closes.

At block 190, if the first electronic wallet 110 is not commanded to close, the method 180 returns to block 184. While the first timer does not expire, the method 180 may continue to loop through blocks 184, 186, 188, and 190 repeatedly. As described above, in an embodiment, the method 180 may go to sleep or otherwise surrender the attention of the processor 140 to avoid busy waiting.

At block 186, if the authorized payment transaction has been completed, the method 180 proceeds to block 194 where the first electronic wallet 110 is closed. At block 196, time is accumulated in a second timer. The second timer is initialized or started in response to the first electronic wallet 110 closing.

At block 197, if the user activates a soft key or a dedicated function key to reopen or reawaken the first electronic wallet 110, the method 180 returns to block 182. In some contexts, the user action that reawakens the first electronic wallet 110 may be referred to as an electronic wallet fast open input. At block 197, if the user does not activate a soft key or dedicated function key to command the first electronic wallet 110 to reopen, the method 180 proceeds to block 198. At block 198, if the second timer has not expired, the method 180 returns to block 196. The method 180 may continue to loop through blocks 196, 197, and 198 repeatedly. As described above, in an embodiment, the method 180 may go to sleep or otherwise surrender the attention of the processor 140 to avoid busy waiting. At block 198, if the second timer expires, the method 180 ends. In some contexts, the expiration of the second timer may be referred to as the second timer exceeding a limit or a second limit.

In an embodiment, the second timer may be implemented with the ready-to-pay timer 142. A close examination of FIG. 3 will confirm that when the first timer is accumulating time, the second timer is not used and when the second timer is accumulating time, the first timer is not used. Therefore, the ready-to-pay timer 142 may be used to support both the first timer and the second timer. In another embodiment, however, the portable electronic device 102 may contain multiple ready-to-pay timers, and the first timer and the second timer may be implemented using separate ready-to-pay timers. In still other embodiments, the first timer and second timer may be implemented in other ways that one skilled in the art, with the assistance of the present disclosure, will readily appreciate.

Figure 4:
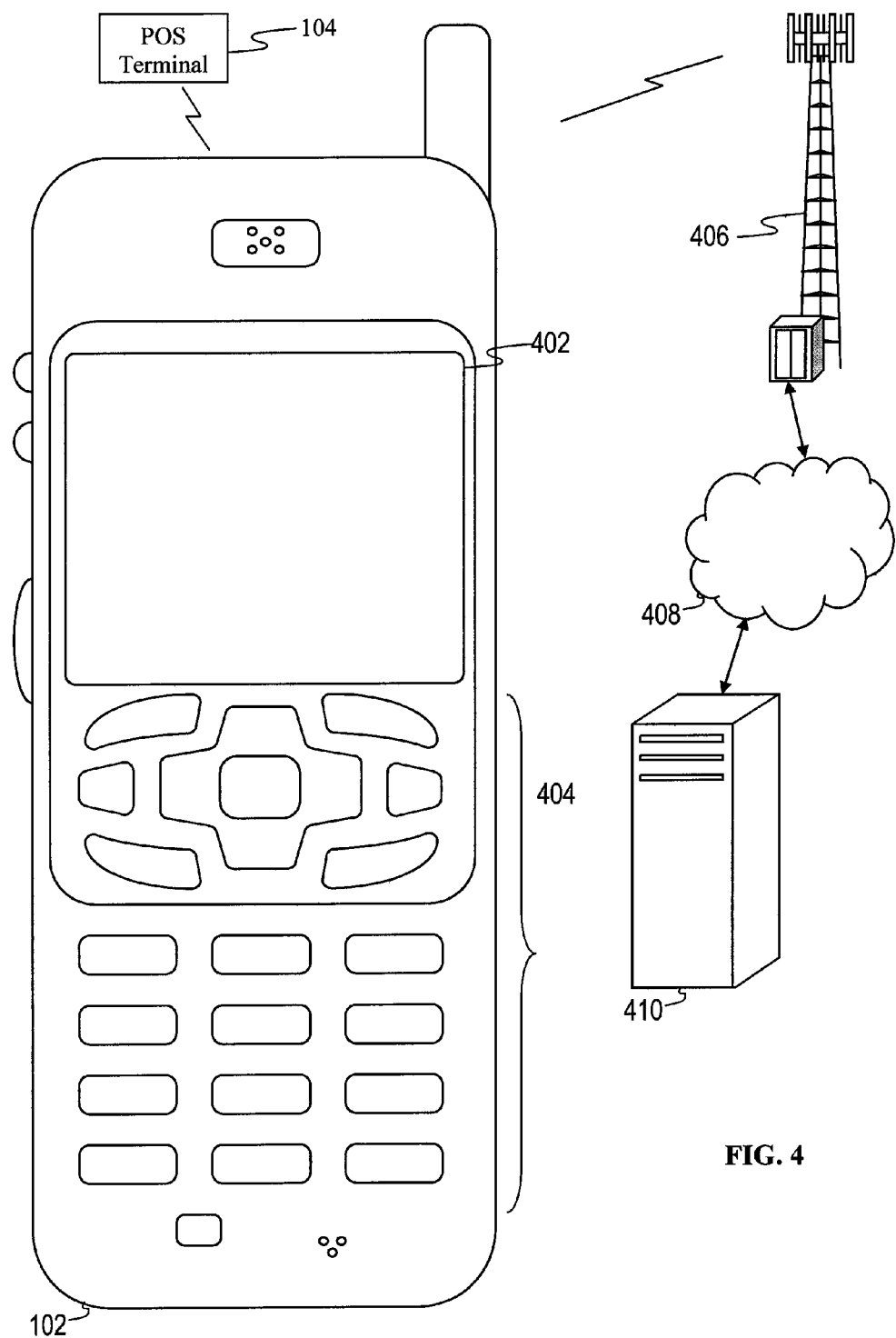
FIG. 4 is an illustration of a portable electronic device according to an embodiment of the disclosure.

FIG. 4 shows a wireless communications system including the portable electronic device 102. FIG. 4 depicts the portable electronic device 102 as a handset, which is operable for implementing aspects of the present disclosure, but the present disclosure should not be limited to these implementations. Though illustrated as a mobile phone, the portable electronic device 102 may take various forms including a wireless handset, a pager, a personal digital assistant (PDA), a portable computer, a tablet computer, or a laptop computer. Many suitable handsets combine some or all of these functions. In some embodiments of the present disclosure, the portable electronic device 102 is not a general purpose computing device like a portable, laptop or tablet computer, but rather is a special-purpose communications device such as a mobile phone, wireless handset, pager, or PDA. The portable electronic device 102 may support specialized activities such as gaming, inventory control, job control, and/or task management functions, and so on.

The portable electronic device 102 includes a display 402 and a touch-sensitive surface or keys 404 for input by a user. Some of the keys 404 may be soft keys whose function when activated depends upon the operation mode of the portable electronic device 102. In an embodiment, the function of the soft keys may be indicated by the soft key itself, for example by a display integral with the soft key itself. Alternatively, the function of the soft keys may be indicated by a portion of a display 402 of the portable electronic device 102 proximate the soft key. Some of the keys 404 may be dedicated function keys that provide special constant features. Some dedicated function keys may close the electronic wallets 110, 112, and 114. Some dedicated function keys may add increments to the time-out interval. The portable electronic device 102 may present options for the user to select, controls for the user to actuate, and/or cursors or other indicators for the user to direct. The portable electronic device 102 may further accept data entry from the user, including numbers to dial or various parameter values for configuring the operation of the handset. The portable electronic device 102 may further execute one or more software or firmware applications in response to user commands. These applications may configure the portable electronic device 102 to perform various customized functions in response to user interaction. Additionally, the portable electronic device 102 may be programmed and/or configured over-the-air, for example from a wireless base station, a wireless access point, or a peer device 102.

The portable electronic device 102 may execute a web browser application which enables the display 402 to show a web page. The web page may be obtained via wireless communications with a cell tower 406, a wireless network access node, a peer device 102 or any other wireless communication network or system. The cell tower 406 (or wireless network access node) is coupled to a wired network 408, such as the Internet. Via the wireless link and the wired network, the portable electronic device 102 has access to information on various servers, such as a server 410. The server 410 may provide content that may be shown on the display 402. Alternately, the portable electronic device 102 may access the cell tower 406 through a peer device 102 acting as an intermediary, in a relay type or hop type of connection.

FIG. 5 shows a block diagram of the device portable electronic 102. While a variety of known components of handsets are depicted, in an embodiment a subset of the listed components and/or additional components not listed may be included in the device 102. The portable electronic device 102 includes a digital signal processor (DSP) 502 and a memory 504. As shown, the portable electronic device 102 may further include an antenna and front end unit 506, a radio frequency (RF) transceiver 508, an analog baseband processing unit 510, a microphone 512, an earpiece speaker 514, a biometric sensor 516, an input/output interface 518, a near field communication (NFC) transceiver card or other contactless communication transceiver 520, a vibrator 522, an infrared port 524, an accelerometer or other transducer 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable device 102 may include other interfaces and components, for example a headpiece port, a universal serial bus (USB) port, and others. In an embodiment, the portable device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like a removable memory card (not shown) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 102 to send and receive information from a cellular network or some other available wireless communications network or from a peer device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the outputs to the earpiece speaker 514. To that end, the analog baseband processing unit 510 may have ports for connecting to the built-in microphone 512 and the earpiece speaker 514 that enable the portable electronic device 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. In an embodiment, the portable electronic device 102 may include the removable memory card (not shown) that communicates with the DSP 502 via the input/output interface 518. The memory 504 and the removable memory card (not shown) may provide software and data to configure the operation of the DSP 502. Among the interfaces may be a USB port (not shown) and the infrared port 524. The USB port (not shown) may enable the portable electronic device 102 to function as a peripheral device to exchange information with a personal computer or other computer system. The infrared port 524 and other optional ports such as a Bluetooth interface or an IEEE 802.11 compliant wireless interface may enable the portable electronic device 102 to communicate wirelessly with other nearby handsets and/or wireless base stations. The NFC transceiver card 520 may promote communications between the portable electronic device 102 and the point-of-sale terminal 104. The DSP 502 may also communicate with the biometric sensor 516. The biometric sensor 516 may detect various biometric characteristics or signatures of a user and provide appropriate biometric input to the DSP 502 or other processor.

The input/output interface 518 may further connect the DSP 502 to the vibrator 522 that, when triggered, causes the portable electronic device 102 to vibrate. The vibrator 522 may serve as a mechanism for silently alerting the user to any of various events such as an incoming call, a new text message, and an appointment reminder. Additionally, the vibrator 522 may serve as a mechanism to silently alert the user to the approach of the expiration of the open wallet time-out interval. The input/output interface 518 may connect the DSP 502 to the accelerometer 526. The accelerometer 526 may serve as a mechanism to sense distinctive movements of the portable electronic device 102 and to provide appropriate motion sensing input to the DSP 502 or other processor. In an embodiment, a different transducer may be employed to detect and/or sense distinctive movements of the portable electronic device 102.

The keypad 528 couples to the DSP 502 via the interface 518 to provide one mechanism for the user to make selections, enter information, and otherwise provide input to the portable electronic device 102. Another input mechanism may be the touch screen LCD 530, which may also display text and/or graphics to the user. The touch screen LCD controller 532 couples the DSP 502 to the touch screen LCD 530.

The CCD camera 534 enables the portable electronic device 102 to take digital pictures. The DSP 502 communicates with the CCD camera 534 via the camera controller 536. The GPS sensor 538 is coupled to the DSP 502 to decode global positioning system signals, thereby enabling the portable electronic device 102 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the portable electronic device 102. Also shown in FIG. 6 are a web browser application 608, a media player application 610, and JAVA applets 612. The web browser application 608 configures the portable electronic device 102 to operate as a web browser, allowing a user to enter information into forms and select links to retrieve and view web pages. The media player application 610 configures the portable electronic device 102 to retrieve and play audio or audiovisual media. The JAVA applets 612 configure the portable electronic device 102 to provide games, utilities, and other functionality. An eWallet application 614, substantially similar to the electronic wallets 110, 112, and 114, is also shown in FIG. 6.

Figure 7:
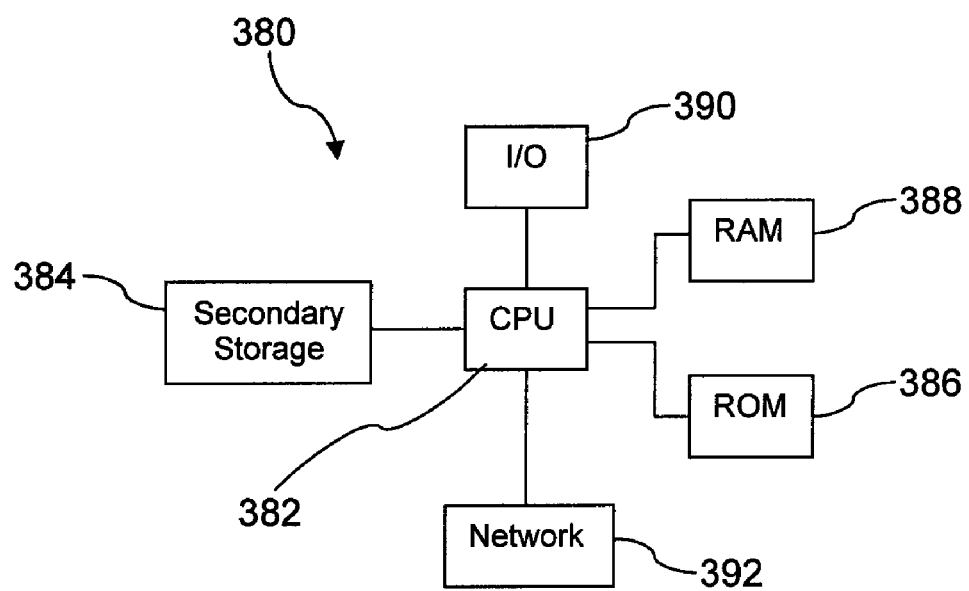
FIG. 7 is an illustration of an exemplary general purpose computer system suitable for implementing some aspects of the several embodiments of the disclosure.

Portions of the system described above, for example the point-of-sale terminal 104 and the payment authorization center 106, may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of completing a payment from an electronic wallet, comprising:
the electronic wallet entering a ready-to-pay electronic wallet mode of operation;
starting a ready-to-pay timer based on entering the ready-to-pay electronic wallet mode of operation;
the electronic wallet leaving the ready-to-pay electronic wallet mode of operation when the ready-to-pay timer expires, wherein the ready-to-pay timer expires after a variable time duration determined based on at least one of a plurality of contexts of the electronic wallet, and wherein at least some of the plurality of contexts of the electronic wallet are associated with a different variable time duration;
the electronic wallet receiving payment transaction messages; and
the electronic wallet transmitting payment information in response to receiving the payment transaction messages if the electronic wallet is in the ready-to-pay electronic wallet mode of operation.

2. The method of claim 1, wherein the ready-to-pay timer expires after about two minutes.

3. The method of claim 1, further including extending the ready-to-pay timer for a pre-determined time duration in response to receiving an extension input.

4. The method of claim 1, wherein the context includes at least one of a day of the week, a time of day, a date, a number of items to be purchased, and a retail location.

5. The method of claim 1, wherein the ready-to-pay timer expires after a user configured time duration.

6. The method of claim 1, further comprising:
the electronic wallet receiving a payment transaction complete message and
the electronic wallet leaving the ready-to-pay electronic wallet mode of operation based on receiving the payment transaction complete message.

7. A method of reducing identity theft, comprising:
opening an electronic wallet;
transmitting payment information from the electronic wallet to complete an authorized payment transaction;
accumulating a first time based on opening the electronic wallet;
closing the electronic wallet after the accumulating first time exceeds a first limit, wherein the first limit expires after a variable time duration determined based on at least one of a plurality of contexts of the electronic wallet;
accumulating a second time in response to the accumulating first time exceeding the first limit; and
reopening the electronic wallet when the accumulating second time is less than a second limit and an electronic wallet fast open input is received.

8. The method of claim 7, further including closing the electronic wallet in response to receiving a user command.

9. The method of claim 7, further comprising:
receiving a payment completed message; and
closing the electronic wallet in response to receiving the payment completed message.

10. The method of claim 7, wherein the payment information is associated with one of a credit card, a debit card, a transit card, a gift card, a coupon, and a gas card.

11. The method of claim 7, wherein the electronic wallet is contained in one of a mobile phone, a personal digital assistant, and a media player.

12. A method of reducing identity theft, comprising:
opening an electronic wallet;
transmitting payment information from the electronic wallet to complete an authorized payment transaction;
accumulating a first time based on opening the electronic wallet;
closing the electronic wallet after the accumulating first time exceeds a first limit;
accumulating a second time in response to the accumulating first time exceeding the first limit; and
reopening the electronic wallet when the accumulating second time is less than a second limit and an electronic wallet fast open input is received, wherein the second limit expires after a variable time duration determined based on at least one of a plurality of contexts of the electronic wallet.

13. The method of claim 1, wherein the variable time duration is one of a plurality of variable time durations, each of the plurality of variable time durations associated with at least one different context of the plurality of contexts of the electronic wallet.

* * * * *